INVENTORS
FRANK W. KLINE, JR.
HOWARD L. DANIELS
BY Cushman, Darby & Cushman
ATTORNEYS Dec. 16, 1958 F. W. KLINE, JR., ET AL 2,864,988

APPARATUS FOR SPEED CONTROL

Filed Oct. 26, 1954 2 Sheets-Sheet 2

INVENTORS
FRANK W. KLINE, JR.
HOWARD L. DANIELS

BY Cushman, Darby & Cushman
ATTORNEYS

United States Patent Office 2,864,988

Patented Dec. 16, 1958

2,864,988

APPARATUS FOR SPEED CONTROL

Frank William Kline, Jr., Minneapolis, and Howard L. Daniels, St. Paul, Minn., assignors, by mesne assignments, to Sperry Rand Corporation, a corporation of Delaware Application October 26, 1954, Serial No. 464,848

20 Claims. (Cl. 318—314)

This invention relates to speed control systems and more particularly to the control of the rate of movement of the surface of a record member such as a drum, disk or tape so as to precisely position points on the surface thereof at successive instants in time. The invention is highly useful in magnetic recording, and for convenience and clarity in providing illustrative examples, the following explanation will proceed with regard thereto.

A magnetic recording medium which has come into widespread use as a medium for storing intelligence is a rotating drum, the surface of which is covered with a thin layer of magnetizable material. Intelligence may be recorded on and played back from the surface of the drum by means of a plurality of magnets or transducing heads rigidly maintained just out of contact with the drum surface. While the magnetic drum has been applied primarily to the storage of digital data, it is being increasingly employed in analog systems. For example, the drum may be used to store time-base signals such as the signal obtained when an FM carrier is modulated with intelligence to be stored. In the usual digital data handling system employing a magnetic drum as a storage medium, the problem of controlling the drum speed is not critical because the recording and playback as well as the operation of the associated circuitry are synchronized by clock pulses generated from a pre-recorded or pre-marked track of the drum. However, when the magnetic drum is used for storage in an analog system or when it operates in a digital system as an asynchronous delay line, a precise means for drum-speed control is a virtual necessity.

Where a magnetic drum contains a pre-recorded track for generating clock pulses, these pulses may also be utilized to synchronize the drum speed by comparing their frequency to the output frequency of a stable oscillator at a discriminator. The difference in phase angle between the two signals is used to adjust the speed of the motor driving the drum, either by altering a braking load or by varying the torque applied by the motor to the drum shaft. The precision of this method of drum-speed control largely depends on the ability of the discriminator to sense a difference in the two frequencies. With equipment presently available, the precision in drum-speed control using this method is far short of that required in many analog recording systems and in certain digital applications.

The present invention, by which precise drum-speed control may be obtained, also operates on the servo control principle with the error signals derived through comparing the phase angles of two signals. However, instead of pre-recording, a reference signal of constant frequency is continuously recorded on the control track and played back through a reading transducer located a predetermined distance around the drum. The signal which has thus been delayed for a number of cycles is then compared to the orignal signal at a phase sensitive detector. When the two signals are not in phase, a control signal is applied to alter the torque delivered by the motor to the drum in such a manner as to tend to bring the signals into phase. This system operates on the principle that the number of wavelengths or cycles delay introduced into the signal by temporarily storing it on the surface of the drum is held constant. The error in phase sensed by the phase detector is an accumulation of the error in each cycle or wavelength stored on the drum. Hence, when the phase detector sees a phase error of $\Delta\theta$ degrees, each cycle contributes $\Delta\theta/N$ degrees of error thereto, N being the number of cycles delay introduced into the signal by storing it on the drum. Since a change in velocity $\Delta V$ of the drum surface results in a corresponding change in phase of the playback signal in relation to the reference signal, a proportionate error is incurred in each cycle of the delayed signal. If the phase detector is capable of detecting a minimum phase error $\Delta\theta$ min, the minimum detectable change in velocity is given by the relation $$\Delta V_1 = k\frac{\Delta\theta \text{ min}}{N} \quad (1)$$

By contrast, a drum-speed control system using a pre-recorded track must derive the full phase error from each cycle on the drum. In this case the minimum detachable change in velocity is $$\Delta V_2 = k\Delta\theta \text{ min} \quad (2)$$

Then if the reference signal and $k$ in each case are the same, we may combine the relationships 1 and 2 to obtain $$\frac{\Delta V_1}{\Delta V_2} = \frac{1}{N} \quad (3)$$

This shows that an error only 1/Nth as large as that detectable in a pre-recorded system may be sensed by a system embodying the present invention to correct the drum speed. The delay in recognizing this error is increased N times and random errors occurring during this extended interval reduce to a certain extent the theoretical improvement in precision. However, in systems embodying the invention, it has been found that because of the relatively great rotational inertia of a magnetic drum, the theoretical precision is closely approached.

In the practice of this invention, two or more reading transducers may be mounted along the control track with coarse control being obtained by playback through the first transducer and relatively finer control obtainable by switching the playback to transducers located further along the track. However, the last reading transducer must not be located at a distance so great that the system becomes unstable. That is, if the error signal from the phase detector is so large that the drum speed is over-corrected, the drum speed will oscillate and cause the system to become unstable.

It is accordingly an object of this invention to provide methods and apparatus for precisely controlling the velocity at which the surface of a record member is moved relative to associated scanning or reading devices.

It is a further object of this invention to provide a system for moving a record member at a precisely controlled velocity including means for bringing the record member from a stop smoothly and quickly to said controlled velocity.

It is another object of this invention to provide methods and apparatus for controlling the velocity of a record member whereby the degree of precision in such control may be readily adjusted over a wide range.

It is another object of this invention to provide a system for controlling the velocity of any movable record member such as a drum, disk, tape, wire or belt whether or not such record member is movable in cycles of travel.

It is accordingly an object of this invention to provide a system for controlling the velocity of a record member which may be applied to synchronize the velocities of other non-similar record members.

In certain applications, the velocity of the surface of a record member relative to its scanning devices need not be precisely controlled as where precision is needed only in governing the time required for a point on the surface to travel from one transducing member to another. In this case, it is only necessary to adjust the position of one of said transducing members relative to the other. It is, therefore, an object of this invention to provide a system by which the time interval during which a point on the surface of a record member moves through a given distance is precisely controlled.

Further objects and features of this invention will be afforded by the following description when considered in connection with the accompanying drawings wherein.

It should be noted that while the description of the embodiment of this invention proceeds with regard to magnetic recording on the surface of a rotating drum, the invention is not limited either to magnetic recording or to cyclical record members but is applicable to the control of the movement of any recording surface relative to its transducing members.

Figure 1:
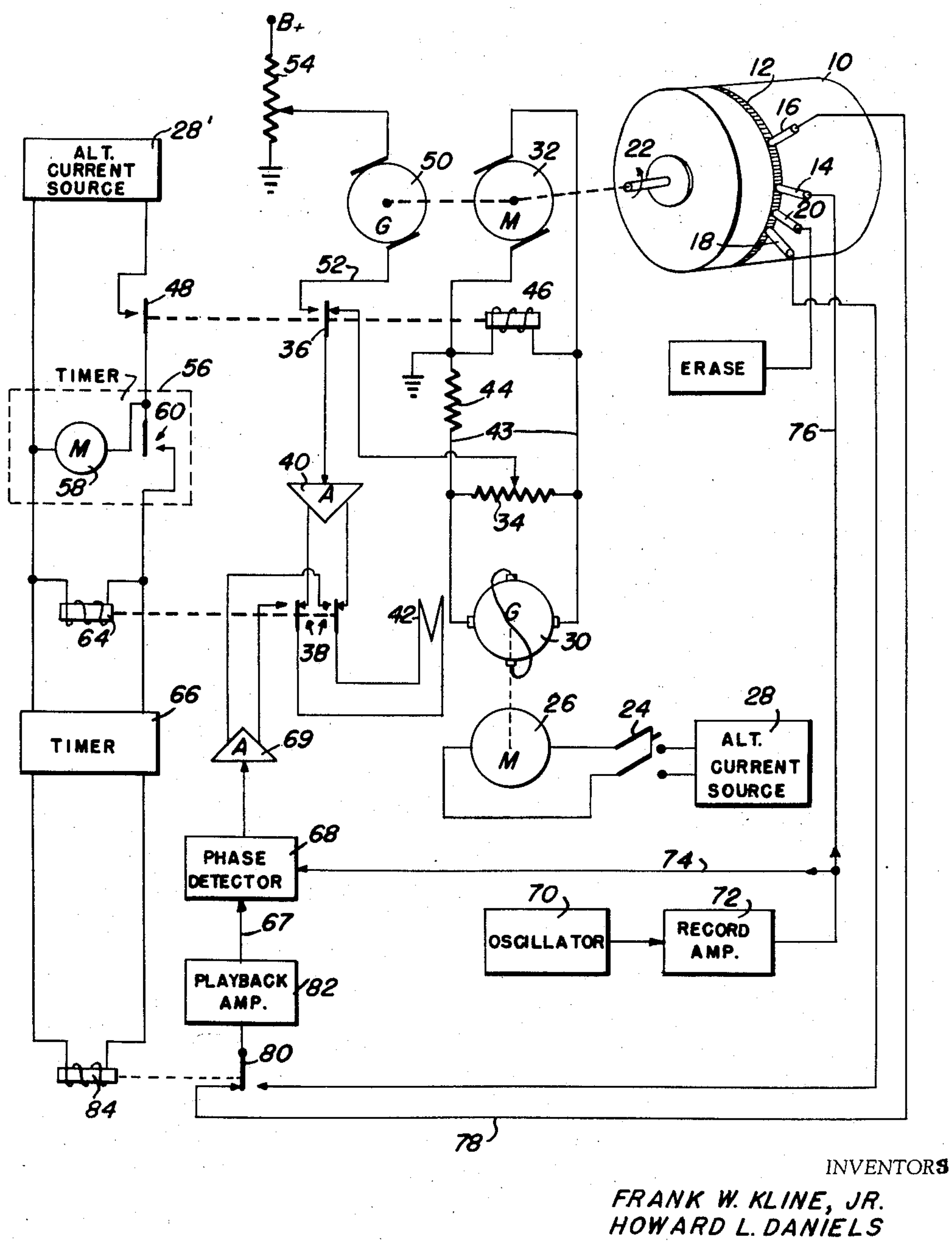
Figure 1 is a schematic diagram showing the invention applied to the control of the speed of a magnetic drum.

In Figure 1 illustrating an exemplary embodiment, there is shown a rotatable magnetic drum 10, one track 12 of which is reserved for speed control purposes. Associated with track 12 are a recording transducer 14, two reading transducers 16, 18, an erase magnet 20 which is so positioned that when drum 10 rotates in the direction 22, recording transducer 14 is presented with a continuously erased record. Control track 12 together with its associated transducing heads is part of a phase control servo mechanism by which the velocity of the magnetizable surface of drum 10 may be precisely controlled as will be shown in detail below. The phase control servo, however, cannot be utilized until the drum 10 is rotated at close to operating speed so that the embodiment of this invention illustrated in the attached drawing incorporates a starting system. This starting system not only brings the drum quickly and smoothly to operating speed but may be utilized in part as a means for damping out any tendency toward hunting in the phase control servo as will be explained below.

To initiate the rotation of drum 10, double pole switch 24 is closed to apply power to motor 26 (preferably of the induction type) from alternating current source 28 which may be a common 60 cycle, 120 volt supply. Motor 26 in turn drives the rotor of a dynamo-electric machine 30 preferably of the amplifier metadyne type, which machine is popularly called an amplidyne. The amplidyne is a specialized type of D. C. generator which lends itself nicely to the purposes of this invention in that it is capable of delivering large amounts of power output from quite small amounts of power input, its response being very sensitive to changes in its excitation field voltage. The output of amplidyne 30 is connected to the armature of drive motor 32 which in turn drives magnetic drum 10. The amplidyne output produces a voltage across potentiometer 34, a predetermined fraction of which is fed back through amplifier 40 via contacts 36, 38, which are initially in the positions shown, to the amplidyne exciter winding 42. This in turn creates a greater voltage across potentiometer 34, causing the speed of motor 32 to increase. It should be noted that motor current through resistor 44 creates a voltage polarized in such a way as to reduce the amplidyne output voltage as related to ground by effectively opposing the current in potentiometer 24 as produced therein by amplidyne 30. This opposing or negative current feedback serves to limit the acceleration of drive motor 32. The negative feedback and, consequently, the acceleration may be adjusted by changing the size of resistor 44. This provides convenient means for applying power to drive motor 32 at a fairly rapid rate while guarding against its being overloaded.

Relay 46 is preadjusted to operate when the voltage across potentiometer 34 reaches a predetermined value, reversing contact 36 and closing contact 48. In reversing contact 36, the feedback loop to amplidyne exciter winding 42 is now completed through speed tachometer-generator 50 rather than through potentiometer 34. It will be seen that the drum speed is now controlled by a velocity servo system, the voltage on line 52 indicating the difference between the output voltage of tachometer-generator 50 and a reference D. C. voltage as preset at potentiometer 54. The error or corrective voltage on line 52 is accordingly applied to amplidyne exciter field 42 to modify the output from amplidyne 30 and consequently to establish the rotational speed of drive motor 32.

When relay 46 was operated to close contact 48, a current was applied to timer 56 from alternating current source 28' which is preferably identical to current source 28. Timer 56 may take any of a number of well known forms. For example, it may comprise a motor 58 (preferably of the synchronous type) which drives a cam to operate after a predetermined time a contact 60 whereby relay 64 is energized, and current is applied to timer 66. The timer 66 may be identical to timer 56 but is not necessarily adjusted to operate at an equal time delay. Relay 64 switches contacts 38 to cut out the velocity servo speed control in favor of control signals arriving from comparison means, such as phase detector 68, which signals are produced in the so-called phase control servo.

Simultaneously with the closing of switch 24 to initiate rotation of drum 10, power was applied to energizing means, such as oscillator 70, which should have a stable frequency and so is preferably a crystal oscillator. The output of oscillator 70 is preferably of sinusoidal form although other forms such as saw-tooth or square waves may be used. Its frequency must be within the recording ability of the record member, 10 to 25 kilocycles having been found satisfactory in conjunction with high speed magnetic drums. The output of oscillator 70, amplified at record amplifier 72, is applied via line 74 to phase detector 68 as well as via line 76 to record head 14 whereby a continuous signal is recorded on track 12. This signal is played back through reading transducer 16 via line 78 and contact 80 to phase detector 68 after being suitably amplified by playback amplifier 82. Any difference in phase between signals on line 74 and those on line 78 causes an error or corrective signal to be applied through amplifier 69 to amplidyne exciter winding 42. Amplidyne 30 then corrects the voltage applied to drive motor 32 to tend to bring the two signals into phase. In short, the speed of the drum will stabilize at an integral number of wavelengths delay between signals on lines 74 and 78, the number of wavelengths being that number nearest the number of wavelengths delay at the time contacts 38 were switched. It is, therefore, vital that the velocity servo bring the drum approximately to operating speed before timer 56 allows relay 64 to be operated. To insure that the phase control servo lock is at the correct number of wavelengths delay, the number is preferably kept small by mounting transducers 14 and 16 at a minimum separation. However the transducers must not be located so closely that crosstalk between the heads result in spurious signals on line 78.

It should be noted that the number of wavelengths delay, and consequently the drum speed, may be varied over a relatively wide range by altering the frequency of oscillator 70, or over a much smaller range by adjusting the distance between transducers 14 and 16. In the latter event, at least one of the two transducers 14, 16 must be adjustable either tangentially or circumferentially along track 12. It should also be noted that the delay introduced by storing the energizing signal onto the record member may be other than an exact number of wavelengths delay as long as the electrical circuit thereafter compensates for the difference and causes the delay to be, in effect, a wavelength (or multiple thereof) delay.

After a predetermined time delay following the closing of contact 60, transfer means including timer 66 operates to cause relay 84 to step transfer switch 80 to its other position. Now, signals recorded on track 12 are played back via reading transducer 18 rather than transducer 16. Transducer 18 is preferably located so that drum 10 completes nearly a full revolution before a signal recorded by the writing transducer 14 is reproduced. Accordingly, a greatly increased number of wavelengths delay is obtained by temporarily storing the output of oscillator 70 on the drum 10, thereby allowing the detection of smaller errors in drum-speed. However, the circumferential distance from transducer 14 to transducer 18 must also be an integral number of wavelengths delay and must not be so great that speed errors tolerated by the system during playback through transducer 16 might allow the delayed signal to be more than 180° from the required phase delay. One means for guarding against this possibility is to mount one or more intermediate reading transducers along track 12 and to provide additional timing mechanisms to step the phase control servo by transferring the successive reading head outputs thereto. Ordinarily the advantages accruing to a system of three or more reading transducers would be outweighed by the added cost and complexity.

In a practical application, it may be desired to rotate drum 10 at a peripheral velocity of 1000 inches per second. Relay 46 may accordingly be adjusted to be energized when subjected to the potential present across the armature of drive motor 32 when the drum reaches a peripheral velocity of 900 inches per second. The drum is then brought close to its final operating speed under control of the velocity servo after which timer 56 switches to the phase control servo. In an actual embodiment, it was found satisfactory to adjust timer 56 for 90 seconds since the velocity servo was able to stabilize the drum speed well within that time. Timer 66 may operate after a 20 second delay, at which time the drum speed will be precisely regulated. The delays at which timers 56 and 66 may be set will of course vary considerably according to the inertia and speed of the drum.

Figures 2, 3:
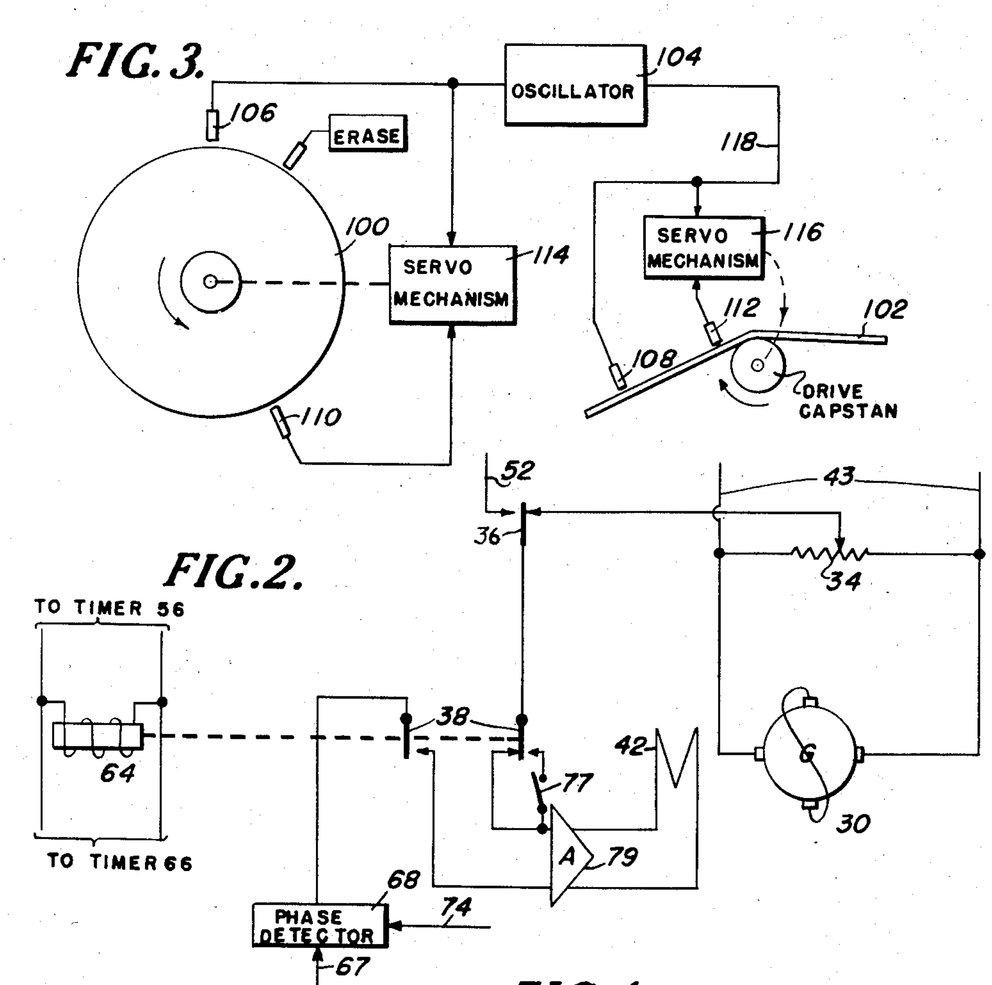
Figure 2 is a fractional schematic diagram illustrating a modification of the invention as applied to the apparatus of Figure 1.
Figure 3 is a block diagram illustrating the application of the invention as applied to the synchronizing of two record members.

In certain applications, it is desirable to regulate the drum speed under control of both the velocity servo and the phase control servo. To do this, the circuit shown in Figure 1 can be readily modified to combine the signals on line 52 with the output from the phase detector 63 in a suitable mixing circuit, using switch 38 to initially select the velocity servo alone and to switch both outputs to the mixer when relay 64 is energized. A modification such as described is shown in Figure 2 with the addition of switch 77 for allowing operation by the phase servo alone if so desired. Amplifier 79 replaces amplifiers 40 and 69 in Figure 1 and provides for suitable mixing of the two error-corrective signals. By combining the velocity and phase control servos, any hunting effect due to the high sensitivity of the phase control servo is damped by the velocity servo output.

It will be appreciated that the freedom from prerecording makes this invention equally applicable to noncyclical record members. The invention can thus be applied to synchronize or maintain in precise ratio the speeds of a number of drums or a number of tapes or even to synchronize drum speeds with tape speeds. The last capability is potentially of great importance in that the low cost and large capacity of magnetic tape and the relatively rapid accessibility of data stored on magnetic drums has led to widespread use of both storage media in the same system.

Figure 3 illustrates an exemplary embodiment of the invention as applied to the synchronizing of two such record members, for example, a drum 100 and tape 102, by utilizing a single energizing means as oscillator 104 to provide a reference frequency signal. Each record member 100, 102 is provided with a control track (not shown), a recording head 106, 108, respectively, a reading head 110, 112 respectively, and a phase servo control mechanism 114, 116, respectively, connected to regulate the speed of its associated record member. These parts and the operation of the speed control for either the drum 100 or the tape 102 are exactly as described for the phase servo system in Figure 1 with it being understood that more than one reading head per either record member can be utilized to obtain finer speed control as previously explained. Since both the drum 100 and tape 102 have a speed related to the frequency of oscillator 104, they will operate in synchronism. Since a tape record is generally moved at a speed slower than that of a drum record, the separation distance between reading head 112 and recording head 108 for the tape record 102 must be short relative to the separation distance between recording and reading heads 106, 110. Another method of compensating for the slower running speed of a tape record is to insert into line 118 an oscillator (not shown) operating as a slave to oscillator 104 and at a frequency more desirable for recording and reading head spacing on tape 102. In this manner the slave or controlled oscillator maintains tape 102 at a speed synchronized with the speed of drum 100 by the master oscillator 104. Of course, more record members could be added and synchronized in a similar manner.

Figure 4:
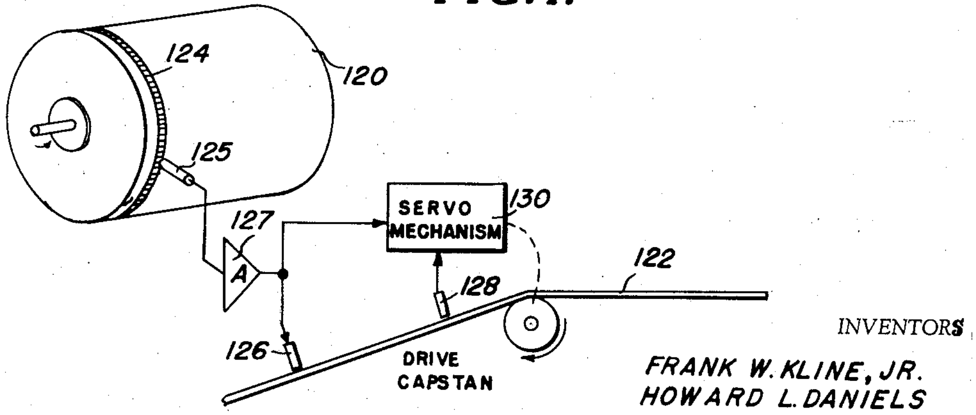
Figure 4 is a block diagram showing the synchronizing of one record member to another in accordance with the invention by utilizing the pre-recorded control signals on the latter.

In Figure 4 there is shown the synchronizing of two record members 120, 122 by utilizing a pre-recorded signal from the control track 124 on the drum 120. Recording head 126, reading head 128 and phase servo control mechanism 130 are associated with tape 122 in the same manner as previously described. In effect the signal from track 124, as read by head 125 and amplified in amplifier 127, controls the speed of the tape 122 in the same manner as oscillator 70 in Figure 1 controls the speed of record member 10. A slave oscillator (not shown) could be employed with the signal from track 124 to compensate for the normally slower speed of a tape record as described above in connection with Figure 3.

Although this invention is disclosed with specific application to magnetic recording, it is to be understood that this is for purposes of illustration only. For instance, the invention is particularly useful in conjunction with recording media of a semi-permanent or eraseable nature because it does not depend on pre-recording.

Other modifications of this invention not described and illustrated herein may become apparent to those skilled in the art, but it is intended that the matter contained in the foregoing description and the accompanying drawings be interpreted as illustrative and not limitative, the scope of the invention being defined in the appended claims.

What is claimed is:

1. In apparatus for controlling the speed of a movable record member having a control track, means including tachometer type means associated with the record member for generating a first corrective signal when the speed of the record member is different than a predetermined speed, means including phase comparison means associated with said control track for producing a second corrective signal when the record member varies from said predetermined speed, means for varying the speed of the record member, said last-mentioned means being responsive to said corrective signals, the arrangement being such that the speed varying means tends to cause the record member to move at said predetermined speed upon receipt of said corrective signals.

2. Apparatus as in claim 1 wherein said speed varying means is adapted to receive only said first corrective signal for a predetermined time and thereafter adapted to receive said second corrective signal, the latter signal being operative to produce finer speed control of the record member than said first corrective signal.

3. Apparatus as in claim 1 wherein said speed varying means is adapted to receive both said corrective signals simultaneously, said means including phase comparison means being highly sensitive to slight variations in the record speed and thereby tending to cause with said second corrective signal oscillation of the speed of the record member around said predetermined speed and said means including tachometer type means by said first corrective signal tending to dampen any tendency of the speed of the record member to oscillate.

4. Apparatus as in claim 1 wherein said means including phase comparison means comprises energizing means producing an output signal connected to the comparison means, and means including transducing means associated with said control track interconnecting the energizing means and the comparison means and arranged to delay the output signal transmitted therethrough a predetermined amount in accordance with said predetermined speed, said comparison means detecting the phase difference, if any, between said output signal and the delayed signal and thereupon producing said second corrective signal.

5. Apparatus as in claim 4 wherein said energizing means produces said output signal at a wavelength λ, and said transducing means comprise recording means and reading means spaced apart along said track a distance Nλ when N equals a predetermined number of wavelengths delay.

6. Apparatus as in claim 4 wherein said energizing means produces said output signal at a wavelength λ and said means including transducing means comprising recording means for recording said output signal on the control track and a plurality of reading means disposed along said track for reading the recorded signal, each of the reading means being spaced from the recording means a different number of wavelengths λ to provide differently delayed signals from predetermined points along the track, and wherein said comparison means is arranged to receive the delayed signals from the reading means successively in the same order as their respective reading means are disposed from the recording means, the arrangement being such that the phase difference, if any, between the output signal of the energizing means and a succeeding delayed signal is larger than the phase difference, if any, from the previously compared delayed signal for a given velocity.

7. Apparatus for controlling the speed of a movable record member having a control track comprising means including generating means connected to the record member for controlling the acceleration thereof, said generating means being provided with exciter means for controlling the output of the generating means with the magnitude of the output determining the speed of the record member, said exciter means being energized by at least a portion of the output during the initial acceleration of the record member and until such time that said output reaches a predetermined value, means including tachometer means for substantially stabilizing the operating speed of the record member after considerable acceleration thereof, said tachometer means being associated with the record member and producing a differential speed error signal therefrom, the error signal supplying energization for said exciter means during a predetermined time interval after said predetermined value of output is obtained, and means associated with said control track for permitting fine speed control, said last-mentioned means including phase comparison means for producing a corrective signal when the speed of the record member differs slightly from a predetermined speed, said corrective signal being connected to energize the exciter means after the end of said predetermined time interval for error signal excitation.

8. Apparatus as in claim 7 wherein said exciter means is energized after the end of said predetermined time interval for error signal excitation by both the error signal and said corrective signal.

9. Apparatus as in claim 7 wherein said exciter means is energized after the end of said predetermined time interval for error signal excitation by said corrective signal only.

10. Apparatus as in claim 7 wherein said means including phase comparison means comprises energizing means producing an output signal connected to the comparison means, and means including transducing means associated with said control track interconnecting the energizing means and the comparison means and arranged to delay the output signal transmitted therethrough a predetermined amount in accordance with said predetermined speed, said comparison means detecting the phase difference, if any, between said output signal and the delayed signal and thereupon producing said corrective signal.

11. Apparatus as in claim 10 wherein said energizing means produces said output signal at a wavelength λ, and said transducing means comprise recording means and reading means spaced apart along said track a distance Nλ when N equals a predetermined number of wavelengths delay.

12. Apparatus as in claim 10 wherein said energizing means produces said output signal at a wavelength λ and said means including transducing means comprising recording means for recording said output signal on the control track and a plurality of reading means disposed along said track for reading the recorded signal, each of the reading means being spaced from the recording means a different number of wavelengths λ to provide differently delayed signals from predetermined points along the track, and wherein said comparison means is arranged to receive the delayed signals from the reading means successively in the same order as their respective reading means are disposed from the recording means, the arrangement being such that the phase difference, if any, between the output signal of the energizing means and a succeeding delayed signal is larger than the phase difference, if any, from the previously compared delayed signal for a given velocity.

13. In apparatus for synchronizing and controlling the speed of a plurality of record members each having a control track, a plurality of recording means, one being associated with each control track, energizing means producing an output signal, each of the recording means being connected to the output signal for recording said signal onto each control track, at least one reading means disposed along the control track of each record member a distance predetermined in accordance with the frequency of said output signal for reading the recorded signal at a delayed time, one of a plurality of means each including servo means interconnecting each recording means, each of said servo means being connected to its respective record member to change the speed of its record member towards a predetermined speed upon detecting a difference, if any, between the output signal of said energizing means and the delayed output from its respective reading means, the arrangement being such that all the record members are synchronized in speed by the output signal of said energizing means.

14. Apparatus as in claim 13 further comprising tachometer type means associated with each record member for generating a differential speed error signal, each of said servo means being connected at least for a predetermined time to said error signal for controlling at least the initial acceleration of each of said record members.

15. Apparatus for accurately detecting a variation in speed of a movable member from a predetermined speed comprising a movable member having a control track, means for moving said member at a speed at least approximating said predetermined speed, recording transducing means along said track, oscillation means for energizing the recording transducing means with a signal having a constant frequency for recording thereof on said track while said member is moving, reading transducing means spaced from said reading means along the track in the direction of movement thereof for reading the recorded signal at at least one point along said track, the signal from said oscillation means being derived completely independently of any output from said reading transducing means, and means coupled to the energizing means and to said reading means for phase comparing the outputs thereof and for producing an output signal when said outputs bear other than a predetermined phase relationship to each other, thereby indicating a difference between the speed of said movable member and said predetermined speed.

16. Apparatus for accurately controlling the speed of a movable member comprising a movable member having a control track, means for moving said member at a speed at least approximating a predetermined speed, recording transducing means along said track, oscillation means for energizing the recording transducing means with a signal having a constant frequency for recording said signal on the track while said member is moving, reading transducing means spaced from said recording means along the track in the direction of movement thereof for reading the recorded signal at at least one point along said track, the signal from said oscillation means being derived completely independently of any output from said reading transducing means, means coupled to the energizing means and to said reading means for phase comparing the outputs thereof and for producing a speed corrective signal when said outputs bear other than a predetermined phase relationship to each other, thereby indicating a difference between the speed of said movable member and said predetermined speed, and means responsive to said corrective signal and coupled to the member moving means for changing the speed thereof, the arrangement being such that upon an occurrence of said corrective signal the movable member is returned to said predetermined speed.

17. Apparatus for controlling the speed of a movable member comprising a movable member having a control track, means for moving said member, recording transducing means along said track, means for energizing the recording transducing means with a signal having a predetermined frequency for recording said signal on the track while said member is moving, reading transducing means spaced from said recording means along the track in the direction of movement thereof at a distance substantially equaling the length of a predetermined number of wavelengths of said frequency, means coupled to the energizing means and to said reading means for phase comparing the outputs thereof and for producing a speed corrective signal when said outputs bear other than a predetermined phase relationship to each other thereby indicating a difference between the speed of said movable member and said predetermined speed, and means responsive to said corrective signal and coupled to the member moving means for changing the speed of the movable member, the arrangement being such that the movable member moves at a predetermined speed when the phase compared outputs have said predetermined phase relationship, but upon variation in the speed of said movable member, said corrective signal occurs to cause return of the movable member to said predetermined speed.

18. Apparatus for accurately controlling the speed of a movable record member comprising a movable member having a control track, means for moving said record member, recording transducing means along said track, means for energizing the recording transducing means with a signal having a predetermined frequency for recording thereof on said track while said record member is moving, a plurality of reading transducing means spaced from said recording means along the track in the direction of movement thereof for reading the recorded signal at various points along said track, said reading means being spaced from the recording means different predetermined distances integrally related to each other relative to the wavelength of said frequency, servo means including phase comparison means coupled to the energizing means and to the reading means sequentially for changing the speed of the movable member toward a predetermined speed upon detecting other than a predetermined phase difference between any one of the outputs from the reading means and the output from the energizing means, a phase difference other than said predetermined phase difference being caused by a variance in the speed of the record member from a predetermined speed, the arrangement being such that a variance causes the servo means to return the record member to said predetermined speed.

19. Apparatus as in claim 18 wherein said servo means includes transfer means for transferring the outputs from the reading means successively to the comparison means, the order of succession being the same as the order of disposition of the reading means from the recording means, said comparison means producing a speed corrective signal upon detecting a phase difference, and means responsive to said corrective signal and connected to said record member for causing a change in the rate of movement thereof, the arrangement being such that the successive outputs from the reading means produce progressively finer control of the speed of the record member.

20. Apparatus for accurately indicating the variance in velocity of a record member from a predetermined velocity comprising a movable record member having a control track, phase comparison means having two inputs and an output, energizing means for producing an output signal of wavelength $\lambda$, said energizing means being coupled to the comparison means at one input thereof, recording transducing means along said track and responsive to said output signal for recording thereof on the track while said record member is moving, a plurality of reading transducing means disposed along said track in the direction of movement thereof for reading the recorded output signal at times later than when recorded, each of the reading means being spaced from the recording means a different number of wavelengths $\lambda$ to produce, respectively, a plurality of differently delayed output signals from predetermined points along the track, the comparison means being selectively coupled at its other input to receive said delayed output signals from the reading means successively in the same order as the respective reading means are disposed from the recording means, said comparison means operating to compare the phase of the signals at its two inputs at any one time for producing an indicative signal in its output upon the detection of other than a predetermined phase difference between its input signals as caused by the velocity of the record members varying from said predetermined velocity, the arrangement being such that any phase difference between the output signal of the energizing means and the respective delayed signals is larger for a succeeding delayed signal than a previously occurring delayed signal.

References Cited in the file of this patent

UNITED STATES PATENTS

| | | |
|---|---|---|
| 2,537,770 | Livingston | Jan. 9, 1951 |
| 2,603,688 | Cole et al. | July 15, 1952 |
| 2,656,419 | Dingley | Oct. 20, 1953 |